July 15, 1924.

A. S. CAMPBELL 1,501,702

WINDOW FOR VEHICLES

Filed June 14, 1919   3 Sheets-Sheet 1

Inventor:
Alphonse S. Campbell
by Potts & Nains
Attorney

July 15, 1924.

A. S. CAMPBELL 1,501,702

WINDOW FOR VEHICLES

Filed June 14, 1919   3 Sheets-Sheet 3

Inventor:
Alphonso S. Campbell
By Roth P. Harris
Attorney

Patented July 15, 1924.

1,501,702

UNITED STATES PATENT OFFICE.

ALPHONSO S. CAMPBELL, OF WEST MEDFORD, MASSACHUSETTS, ASSIGNOR, BY MESNE ASSIGNMENTS, TO A. S. CAMPBELL COMPANY, OF BOSTON, MASSACHUSETTS, A CORPORATION OF MASSACHUSETTS.

WINDOW FOR VEHICLES.

Application filed June 14, 1919. Serial No. 304,195.

*To all whom it may concern:*

Be it known that I, ALPHONSO S. CAMPBELL, a citizen of the United States, residing at West Medford, county of Middlesex, and State of Massachusetts, have invented an Improvement in Windows for Vehicles, of which the following description, in connection with the accompanying drawings, is a specification, like characters on the drawings representing like parts.

The invention to be hereinafter described relates to windows and more particularly to windows for automobile tops and this application is a continuation in part of my application Serial Number 218,673, filed February 23, 1918, for automobile windows.

Serious difficulties have heretofore been experienced in satisfactorily connecting windows to the flexible fabric of automobile tops. Recently it has been found desirable to use a large, thick, heavy glass, but the vibration, shocks and air pressure which automobile tops necessarily experience are liable to tear the heavy glass from the flexible fabric of the top. One of the purposes of the invention, therefore, is to provide a strong and simple frame construction provided with devices for securely connecting the glass to the fabric.

Opposed frames have been provided adapted to receive between them the margin of the fabric surrounding the opening for the glass, and in some instances these frames have been connected by bolts. These bolts, however, have projected through one or both of the opposed frames, so that the ends thereof are exposed, liable to catch on articles coming in contact therewith, are objectionably visible, and disfigure the outward appearance of the frame. Another purpose of the invention, therefore, is to provide a window construction in which the bolts or securing devices for the frames are concealed from view within external covering frames which may have smooth and uninterrupted outer surfaces presenting a pleasing finished appearance. One of these covering frames may be so connected to another of the frames that it may be readily moved from covering relation thereto, and enable ready access to the bolts or devices in assembling and separating the frames.

In manufacturing the frames in quantities, it is desirable to employ thin sheet metal and to shape the frames by die stamps. Another purpose of the invention is to so shape the frames that they will have the stiffness and strength requisite to securely connect the glass to the fabric of the top, and withstand the hard usage which such windows experience.

Heretofore, in some instances, the frames for the glass have been secured to the fabric by a tongue in one frame mating with a groove in the other, the construction being such that when the frames are pressed toward each other, the fabric is forced by the tongue into the groove. In so doing, however, the fabric adjacent the frames is puckered and wrinkled, thereby giving the fabric an objectionable, unsightly appearance. Another purpose of the invention, therefore, is to provide opposed frames with flat surfaces of substantial width between which the margin of the fabric is pressed, the construction being such that the fabric is maintained in flat, unwrinkled condition.

As stated, it is desirable to employ a thick, heavy glass, and preferably the edge of the glass is beveled. It is difficult accurately to bevel the edge of the glass throughout, and as a consequence, frequently the beveled edge is thicker in some places than in others. Another purpose of the invention is to provide a frame for the glass which will have a flexible inner marginal portion which may yield as the screw bolts or securing devices are tightened to conform accurately to any variation in the thickness of the beveled edge of the glass.

In wet weather the driving rain striking the glass is liable to leak or work between the glass and fabric or between the frame and fabric into the interior of the top. Another purpose of the invention is to provide a frame construction which may be light but sufficiently stiff to grip the glass and fabric so tightly as to prevent any possibility of leakage.

For economy of materials and time and labor in securing the frames together, it is desirable to employ merely a few screw bolts or securing devices which are entered through the fabric and the frames engaging the opposite faces thereof, but the vibration, rack and shocks which the window receives are liable to tear the bolts or securing devices from the fabric or allow portions of the fabric between the bolts to be pulled from the frames and cause leakage and an unsightly appearance. Another purpose of the invention is to provide one of the frames with spurs or prongs between the bolts or securing devices, the construction being such that when the fabric engaging frames are drawn together, the spurs or prongs will penetrate the fabric and positively secure the same to the frames at the spaces between the points of location of the bolts or securing devices.

With the aforesaid and other objects in view, the character of the invention may be best understood by reference to the following description of a good form thereof shown in the accompanying drawings, wherein:

Figure 1 is an elevation of a window embodying the invention, a portion of one of the frames thereof being broken away to disclose parts back of the same, the view being taken from that side of the installation which is preferably located toward the inside of the car;

Fig. 2 on an enlarged scale is a transverse section taken on line 2—2 of Fig. 1;

Fig. 3 on an enlarged scale is a transverse section taken on line 3—3 of Fig. 1;

Fig. 6 is a perspective view of a detail to be referred to;

Figure 1:
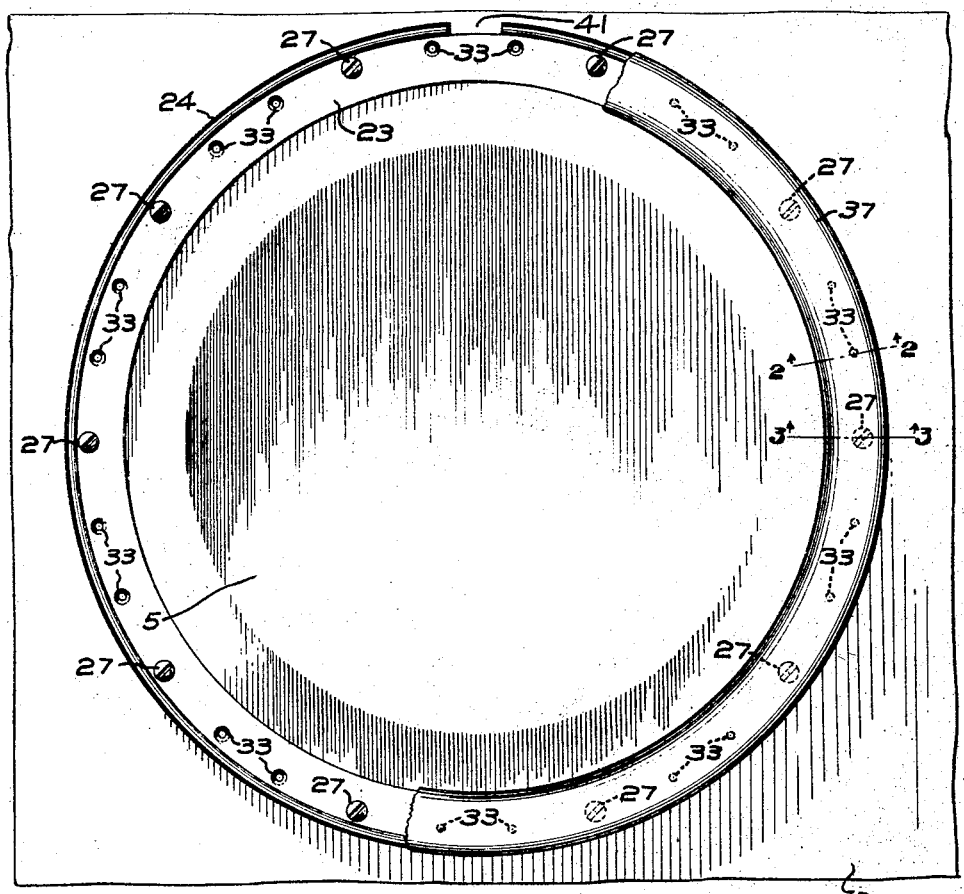
Figures 2, 3:
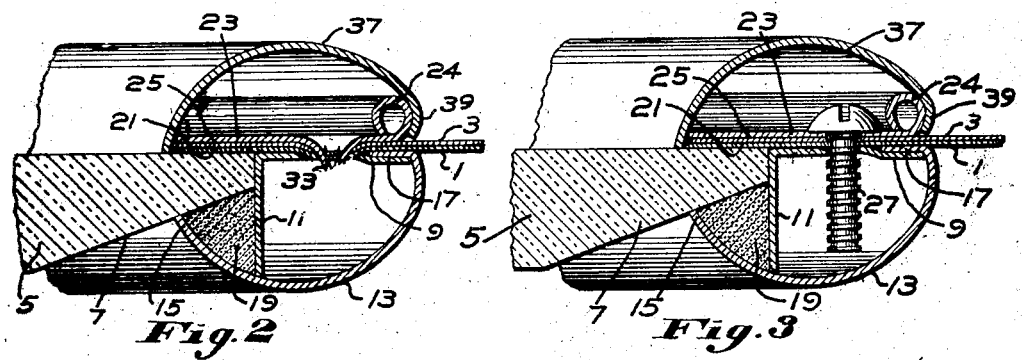
Figure 4:
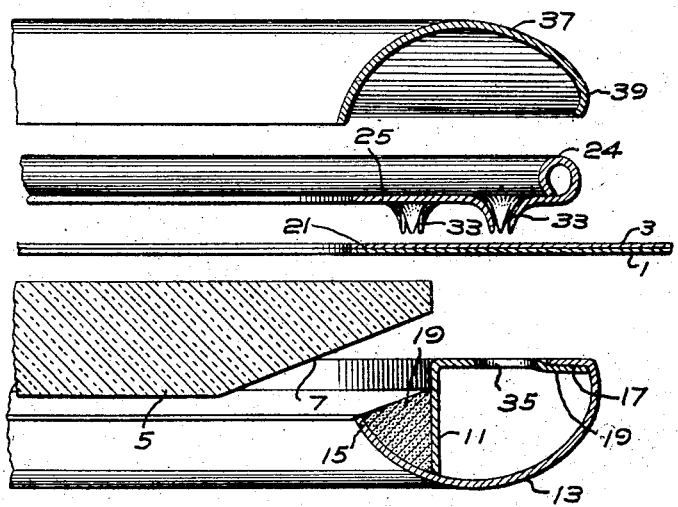
Fig. 4 is a transverse sectional view of parts of the window unassembled.
Figure 5:
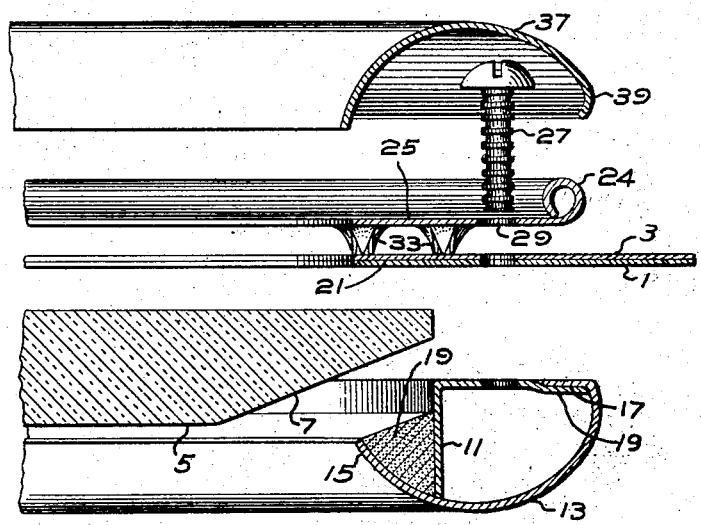
Fig. 5 is another transverse sectional view of the parts unassembled.
Figure 6:
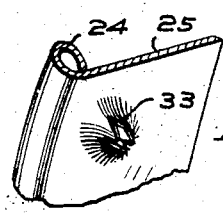

Referring to the drawings, the fabric for the top may be of any appropriate material, but in the present instance of the invention it comprises an outer fabric 1 and a lining or inner fabric 3. The window may have oval, circular or other shape desired, but in the present instance, is shown of circular form.

Any suitable glass may be provided for the window, but preferably a thick, heavy glass 5 is employed having a beveled edge 7. A suitable frame may be provided to receive the glass, and in the present instance, comprising an internal securing frame 9 having an outstanding flange 11 for engagement with the periphery of the glass. A covering frame 13 may be provided for the securing frame 9 and preferably is transversely curved and has a smooth uninterrupted outer surface. The inner edge of the covering frame 13 may project beyond the securing frame flange 11 and present a seat 15 for the beveled edge of the glass. The securing frame 9 and the covering frame 13 may be formed of separate pieces or may be of integral construction, but in the present instance, they are shown as made of separate pieces and are permanently connected by a lip 17 at the outer edge of the covering frame adapted to be bent inward so as to overlie the outer edge portion of the securing frame, as will be noted in Figs. 2 to 5. The construction is such that the securing frame may be introduced into the covering frame and then the lip may be bent over as described, thereby permanently to secure the two frames together.

While preferably the covering frames 9 and 13 are died and shaped from sheet metal as described, it will be readily understood that they might be formed of one solid piece of metal if desired.

To contribute to the production of a water-tight construction, a packing of cement 19 may be introduced in the space between the securing frame flange 11, the inner portion 19 of the covering frame 13 and the beveled edge of the glass, thereby effectively preventing water from creeping along the beveled edge of the glass past the periphery of the glass.

The margin of the fabric surrounding an opening in the glass may be superposed on the securing frame 9 and have a portion 21 overlying the margin of the glass. To press the margin of the fabric tightly against the securing frame 9 and the margin of the glass, an internal securing frame 23 may be provided and formed to present an outstanding curved lip or flange 24 and an inner portion 25 projecting inward from said curved lip or flange of a sufficient width to overlie the portion of the fabric which serves as a cushion for the glass.

Figure 7:
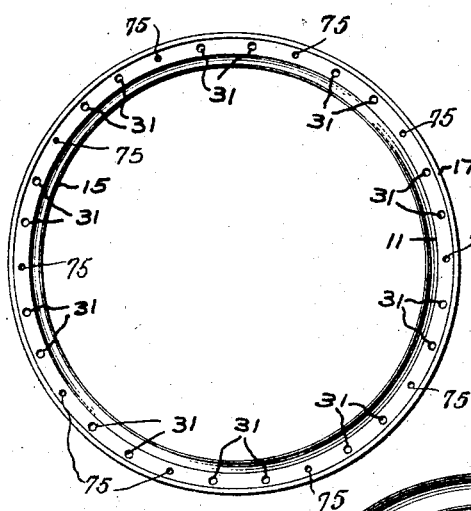
Fig. 7 is a face view of the glass receiving frame.
Figure 8:
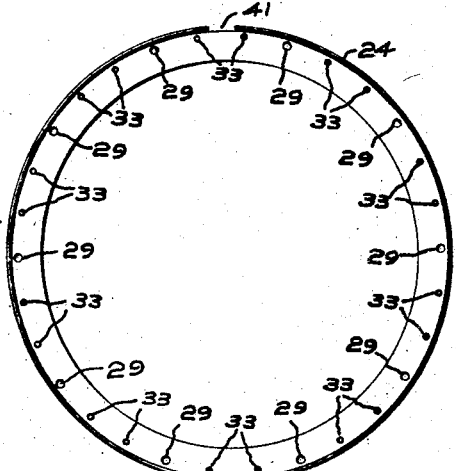
Fig. 8 is a face view of one of the securing frames.
Figure 9:
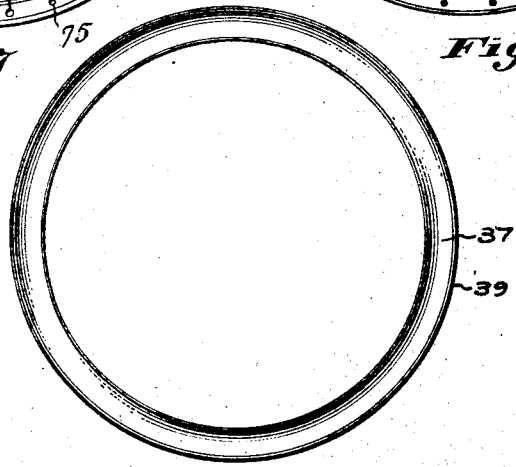
Fig. 9 is a face view of an external covering frame.

Suitable devices may be provided for clamping the fabric securely between the securing frames 9 and 23. In the present instance of the invention, these devices are in the form of screws 27 entered loosely through holes 29 (Fig. 8) in the securing frame 23 and threaded into holes 75 (Fig. 7) in the securing frame 9. These screws also pass through holes in the margin of the fabric. The construction is such that when the screws are tightened they will clamp the fabric between the securing frames. When the securing frame 9 is died from sheet metal as described, the threads on the screws may have a spacing equal to the thickness of the sheet metal, thereby eliminating the necessity for tapping the holes for receiving the screws in the securing frame.

It will be noted that the ends of the screws project into the chamber formed between the securing frame 9 and the covering frame 13, but do not project into or beyond the latter. As a consequence, the ends of said screws are concealed from view.

As stated, it is desirable to provide means between the screws further to secure the fabric to the securing frames. To accomplish this, in the present instance of the invention, the securing frame 23 may be provided with spurs or prongs 33 (Figs. 2, 4, 5 and 6) conveniently died therefrom, and the securing frame 9 may have holes 35 formed therein in opposition to the spurs or prongs and preferably somewhat larger than the same. The construction is such that when the securing frames are pressed against the opposite faces of the fabric of the top, the spurs or prongs will penetrate the fabric and may enter the holes 35, as will be noted in Fig. 2, thereby positively connecting the fabric to the securing frame at intervals between the screws, the construction being such that the fabric is effectively prevented from being pulled out of the frames. This positive connection of the fabric to the securing frames is accomplished incidentally to the presentation of the securing frames to the fabric, and therefore, does not require any attention in assembling the frames.

Suitable means may be provided for concealing the heads of the screws 27 and the securing frame 23. To accomplish this, in the present instance, an external covering frame 37 is provided preferably transversely curved and having a continuous uninterrupted surface. Suitable means may be provided to enable this covering frame to be moved relatively to the securing frame 23 and permit ready access to the screws when desired. To accomplish this, in the present instance, the covering frame 37 is provided with a curved lip 39 which may have sufficient yield or spring to enable the same to snap into interlocking engagement with the curved lip 24 referred to, of the securing frame 23. The inner edge of the external covering frame 37 may project beyond the inner edge of the fabric to cover and conceal the same. To facilitate movement of the covering frame 37 from covering relation with respect to the screws, the curved lip 24 may have an interruption leaving a space 41 (Fig. 1) to admit a suitable tool for prying or starting the cover frame lip 39 from the securing frame lip 24.

It will be noted that the margin of the fabric is confined between flat faces of the securing frames of substantial width, and thus the fabric is maintained in smooth, unwrinkled condition throughout. The curved lip 24 desirably serves as a stiffening rib for the outer edge of the securing frame 23, and the screws 27 are preferably located closely adjacent to this stiffening rib, the construction being such that the outer edge portion of the securing frame 23 is held in intimate relation with the fabric, thereby preventing any possibility of water creeping in between the fabric and the securing frames. The inner portion, however, of the securing frame 23 has sufficient flexion so that it may yield to conform to any variation in thickness of the beveled edge of the glass, and therefore, the inner portion of the securing member will press the inner edge portion of the fabric intimately against the glass and prevent water from creeping along the flat face of the glass to the periphery of the glass.

By the construction described, simple and efficient means is provided for positively securing the fabric to the frames and for securely holding the glass to the frames, and the parts may be readily assembled and separated as desired. In assembling the parts, the glass may be presented to the securing frame 9 and covering frame 13 with the edge of the glass resting against the flange 11 of the securing frame, and the beveled edge of the glass resting against the edge seat 15 of the covering frame. Then the fabric may be superposed on the glass and the securing frame 9, and the securing frame 23 may be superposed on the fabric. The screws 27 are next inserted through the securing frames and fabric, thereby pressing the spurs or prongs 33 into the fabric and securely connecting the latter to said frames. The securing frame 23 may desirably serve as a templet which may be engaged by a suitable cutting instrument accurately to cut the opening in the fabric in conformity with the opening in the securing frame 23. Then the covering frame 37 may be presented to the securing frame 23 and pressed against the same to cause the lip 39 to snap into interlocking engagement with the lip 24, and the assembly of the parts is complete.

If for any reason it is desired to remove the glass from the fabric, it is merely necessary to snap the cover frame 37 away from the securing frame 23, thereby exposing the heads of the screws which may be released to allow separation of the securing frames.

Figure 10:
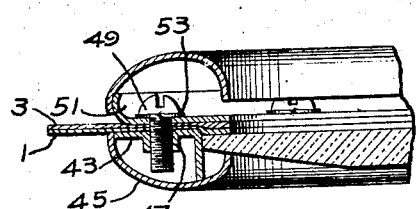
Fig. 10 is a transverse section of a modified form of window construction.

Referring to Fig. 10, the construction there shown is similar to the construction already described, with the exception that the securing frame 43 and the covering frame 45 are welded together, the securing frame is provided with a neck 47 tapped to receive the screws 49, and the curved lip 51 is not curved around to the same extent as the lip 24 described. Spring locking washers 53 may be provided to secure the screws in the positions to which they are adjusted, although these washers are not indispensable.

It will be understood that the invention is not limited to the specific embodiment shown, but that various deviations may be made therefrom without departing from the spirit and scope of the appended claims.

What is claimed is:—

1. A window for vehicle tops, comprising, in combination, opposed securing frames for receiving between them the margin surrounding an opening in the fabric of the top, securing means intermediate the edges of said securing frames at intervals to draw said frames toward each other and securely clamp the fabric margin between them, a glass for said opening, and a pair of cover frames independent of and enclosing and concealing said securing means and superposed on said securing frames, one of said cover frames and one of said securing frames having means detachably to secure the two together.

2. A window for vehicle tops comprising, in combination, opposed securing frames for receiving between them the margin surrounding an opening in the fabric of the top, holding elements to hold the frames together and clamp the fabric between them, a glass for said opening, a cover frame independent of said holding elements and enclosing and concealing the ends thereof, and fastening means including cooperating marginal lips, one on said cover frame and the other on the frame adjacent said cover frame, at least one of said lips resilient for yieldable interlocking engagement with the other.

3. A window for vehicle tops, comprising, in combination, opposed securing frames for receiving between them the margin surrounding an opening in the fabric of the top, holding elements for said securing frames to securely clamp the fabric margin between said securing frames, a glass for said opening, and a cover frame concealing the ends of said holding elements and superposed on one of said securing frames, one of said securing frames having an outstanding marginal lip, and the cover frame having an outstanding marginal lip, one of said lips being yieldable for interlocking engagement with the other.

4. A window for vehicle tops, comprising, in combination, opposed internal securing frames for receiving between them the margin surrounding an opening in the fabric of the top, holding elements for securely clamping said margin between the internal frames, a glass for said opening, a pair of cover frames for covering the internal securing frames, one of said securing frames having a flange projecting transversely to the plane of the body of said frame to engage the edge of the glass, and the cover frame covering the latter securing frame having an edge adjacent said flange to overlie and engage a face of the glass, one of said external covering frames and one of the internal securing frames having means detachably to secure the same together.

5. A window for vehicle tops, comprising, in combination, opposed frames for receiving between them the margin surrounding an opening in the fabric of the top, securing elements co-operating with said frames to clamp the margin of the fabric securely between the said frames, a glass for said opening, an external covering frame having an uninterrupted and non-perforated exterior surface, said external covering frame and one of the opposed frames having interlocking peripheral edges at least one of which is resilient adapted to detachably secure the same together.

6. A window for vehicle tops, comprising, in combination, a glass for an opening in the fabric of the top, a frame receiving the edge of the glass, a securing frame opposed to said frame which receives the edge of the glass and having a flexible inner marginal portion overlapping the margin of the glass and yieldable to conform thereto and a stiffening portion outside of the flexible marginal portion, said frames being adapted to receive between them the margin of the fabric surrounding said opening, holding elements projecting through said securing frame and fabric and into the glass receiving frame to clamp the fabric securely between said frames, an external covering frame concealing ends of said holding elements, and means for securing the covering frame to the securing frame and permitting the covering frame to be moved from covering relation to the securing frame to expose the holding elements.

7. A window for vehicle tops, comprising, in combination, a glass for an opening in the fabric of the top, a frame receiving the glass and adapted to be superposed on one side of the margin of the fabric surrounding said opening, a securing frame adapted to be superposed on the opposite side of the fabric and having a flexible internal marginal portion overlapping the margin of the glass and yieldable to conform to the glass, screws passing through both of said frames and penetrating the fabric to secure the fabric between said frames, said screws being located a substantial distance from the inner edge of the securing frame to avoid interference with the flexion of the internal marginal portion thereof, an external covering frame for concealing the heads of the screws, said securing frame presenting an edge portion and said covering frame presenting a resilient peripheral portion for engagement with said edge portion to hold said covering frame in covering relation to the securing frame and permitting the covering frame to be moved from covering relation to the securing frame to expose the holding elements.

8. A window installation for vehicle tops comprising, in combination, a frame presenting a flat curtain engaging surface for application to one side of the curtain, a second securing frame also having a flat curtain engaging surface for application to the opposite side of the curtain, clamping means intermediate the edges of said flat surfaces adapted to press said frames into gripping relation with said curtain, one of said frames presenting an edge seat for a glass and the other frame presenting a portion for engaging the glass adjacent its peripheral edge; a glass seated in said frames, and a cover frame removably secured to one of said frames, said cover frame also presenting a glass engaging portion and adapted, upon removal, to afford access to said securing means.

9. A curtain window installation comprising, in combination, a securing frame having screw-receiving holes therethrough, a second securing frame made of sheet metal having a plurality of openings therethrough registering with said holes, said securing frames lying on opposite sides of the curtain fabric, screws entered through said holes and threaded into the openings in said second securing frame, the metal about said openings being distorted whereby securely to engage the screw threads, a cover associated with said second securing frame for concealing the ends of the screws entered therethrough and the distorted portions about said openings.

10. A window for vehicle tops comprising, in combination, a glass for an opening in the fabric of the top, a frame receiving the glass and adapted to be superposed upon one side of the margin surrounding said opening, a securing frame adapted to be superposed at the opposite side of the fabric and providing an inner edge overlying the glass and an upstanding peripheral edge, securing means holding said frames together and penetrating the fabric between said frames, and an external covering frame for concealing said securing frame and said holding elements, said external covering frame presenting a peripheral resilient curved edge for engagement behind said upstanding peripheral portion of said securing frame.

11. A curtain window installation comprising, in combination, a frame portion for application to one side of the curtain, securing means for holding a glass in assembled relation to said frame portion, a cover portion for application to the opposite side of the curtain from said frame portion, and presenting an uninterrupted and unperforated outer surface the inner edge of which extends into adjacency to the glass and the outer edge of which extends into adjacency to the curtain, the portion of said cover intermediate said edges extending a substantial distance outwardly from the plane of the fabric, and holding means for securing said cover portion in assembled relation to the other parts of the curtain installation, said holding means including resilient flange means surrounding the glass and adapted to engage a cooperating part also surrounding the glass.

12. A curtain window installation comprising, in combination, a securing frame having screw-receiving holes therethrough, a second securing frame of metal having a plurality of openings therethrough registering with said holes, the metal from said openings distorted to provide tube-like projections of a length substantially greater than the thickness of said second securing frame, said securing frames adapted to be arranged on opposite sides of the curtain fabric, screws entered through said holes and threaded into said tube-like projections, and a hollow cover for said second securing frame concealing said tube-like projections and the ends of the screws entered therethrough.

13. A curtain window frame including a continuous glass-surrounding unit for application to one side of a curtain and glass, said unit comprising interior and exterior parts, the exterior part presenting a recessed interior, the interior part presenting a flange generally parallel to the glass adapted to engage the curtain and a second flange angled relative to said first flange and having its free edge seated near the bottom of said recess, said parts held in assembled relation by an overlying flanged portion of the exterior part extending over one of said flanges.

14. A curtain window frame including a continuous glass surrounding unit for application to one side of a curtain and glass, said unit comprising, an outer recessed part and an inner part seated in the recessed portion of said outer part, said inner part having a flange presenting a plane surface for engaging the curtain wall and a second flange at an angle to said first flange, said second flange having its free edge seated on the interior of said recessed portion intermediate the edges of said outer part, and said inner part providing means for cooperation with a supplemental glass retaining unit.

15. A curtain window frame including a continuous glass-surrounding unit for application to one side of a curtain and glass, said unit comprising interior and exterior parts, the interior part providing a strut bearing against the interior of the exterior part, and said exterior part providing at one edge a glass-engaging portion and at the other edge a retaining flange overlying said interior part.

16. In a curtain window frame construction, a unit adapted to be secured on the outside of the curtain comprising, a securing frame member having a flange adapted to contact with the surface of the curtain and an outstanding flange extending approximately at a right angle to said curtain engaging flange providing a seat for the marginal edge only of a glass inserted therein, a cover frame member on said securing frame member adapted to engage said glass whereby to hold it and retain it in seated relation within said outstanding flange, and means for securing said unit to the curtain.

17. A curtain window installation comprising, in combination, a securing frame presenting an abutting surface for the edge of a glass, a second securing frame presenting a glass retaining portion projecting beyond the inner edge of said first mentioned securing frame, a cover frame secured to said first mentioned frame and presenting a glass engaging portion cooperating with said glass retaining portion on the second mentioned securing frame whereby to hold the glass in seated relation, a glass in said frames, and means for securing said frames in gripping relation on said curtain.

18. A curtain window installation comprising, in combination, opposed frames for receiving between them the margin surrounding an opening in the curtain, securing means for clamping said frames securely to the curtain, a glass within the opening, a resilient covering frame for one of said opposed frames presenting means adapted to snap into engagement with an edge portion of the frame whereby detachably to secure them in interlocked relation and to facilitate removal of the glass.

19. A curtain window installation comprising, in combination, a pair of opposed sheet metal frames secured to the marginal edge of the fabric adjacent the window opening, one of said frames presenting a portion overlapping the other and projecting inwardly toward the opening therein to provide a glass contacting surface, the other frame presenting an outstanding flange forming an abutting surface for the edge of the glass, means for securing said frames in gripping relation to the curtain, and a cover frame secured to said frame having the outstanding flange and concealing said securing means on one side of the curtain, said cover frame also presenting a portion for engaging the glass whereby to hold it securely in seated relation.

20. A curtain window installation comprising, in combination, a pair of opposed frames secured in gripping relation to the curtain, one of said frames presenting an outstanding flange to provide an abutting surface for the edge of the glass, a glass seated in said frames, and a cover frame secured at one edge to said frame having the outstanding flange, said cover frame also engaging said outstanding flange and presenting an inner marginal edge engaging said glass whereby to hold it in seated relation within said frames.

In testimony whereof, I have signed my name to this specification.

ALPHONSO S. CAMPBELL.